United States Patent Office 3,696,035
Patented Oct. 3, 1972

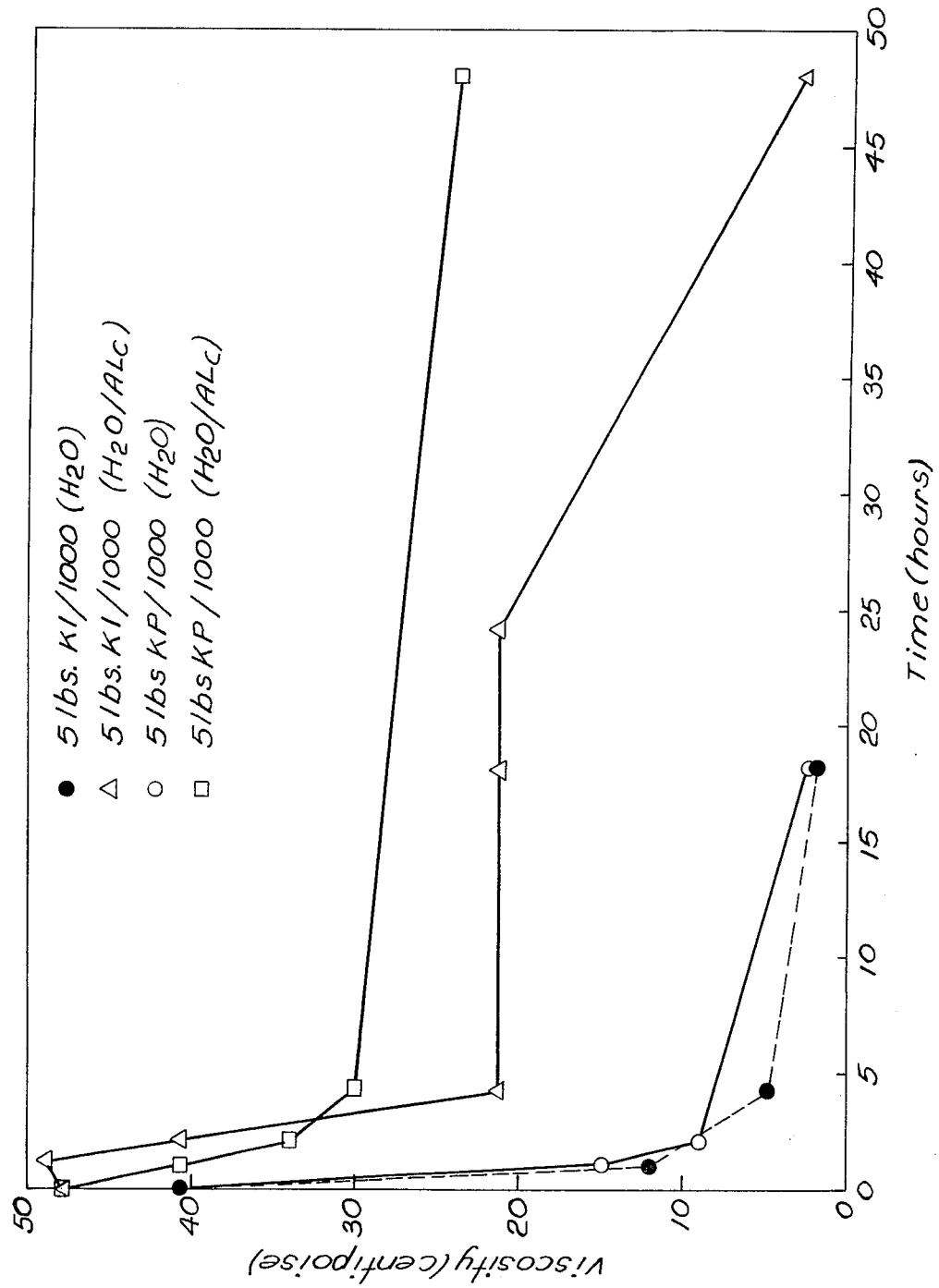

3,696,035
WELL TREATMENTS WITH THICKENED AQUEOUS ALCOHOL MIXTURES
Kenneth H. Nimerick, Tulsa, Okla., assignor to The Dow Chemical Company, Midland, Mich.
Continuation-in-part of application Ser. No. 666,853, Sept. 11, 1967. This application Nov. 4, 1970, Ser. No. 86,925
Int. Cl. E21b 43/25, 43/26
U.S. Cl. 252—8.55 R
7 Claims

ABSTRACT OF THE DISCLOSURE

A novel thickened liquid composition and method of treating wells is described herein. The liquid composition comprises an aqueous-alcohol mixture thickened with a cellulose derivative thickener and containing as an internal breaker a periodic acid and/or a water soluble salt thereof.

CROSS REFERENCE TO RELATED APPLICATIONS

This application is a continuation-in-part of application Ser. No. 666,853, filed Sept. 11, 1967.

BACKGROUND OF THE INVENTION

Hydraulic fracturing compositions have been used extensively to fracture subsurface earthen formations so that the production of a fluid, e.g. gas, air, water, etc., may be increased or initiated. Fracturing is accomplished by pumping a fluid into a wellbore which penetrates the formation and applying pressure on the fluid so that compressive and tensile forces are created on the periphery of the borehole. When these forces become sufficiently great they force the rock apart and start splits in the rock which are lengthened by the pressurized fluid which is being forced into the splits from the borehole. It is well established that thickened and/or gelled aqueous-alcohol mixtures are suitable fracturing fluids. These mixtures have certain advantages over, for example, oil base fracturing liquids and the like. Because of having a low surface and interfacial tension, high vapor pressure, a solvation action on formation fluids and the like, these fluids can be injected at a faster rate and allow a higher degree of clean-up following the treatment.

Modified celluloses and other water-soluble organic polymeric thickeners have been employed to thicken these aqueous-alcohol fracturing liquids. As with other fracturing liquids it is preferred that the liquid is capable of carrying a particulate propping material, e.g. sand, in suspension while being pumped down the well and into the fractures which are formed in the formation. It is also desirable that these fracturing liquids be capable of depositing the propping material in the fracture. Further, it is desirable that these liquids have a viscosity which is low enough so that they can be readily pumped down the well, and it is most highly desirable that upon completion of the fracture and the depositing of the propping agent that the liquids can be removed from the formation without leaving a residue which plugs the pores of the formation thus reducing the permeability thereof.

In the past various internal breakers have been employed to reverse the thickening action of certain thickening agents after a certain period of time so that a thickened fracturing liquid reverts to a flowable fluid which does not harm permeable formations. However, in aqueous-alcohol systems it has been discovered that most of the well known breakers do not effectively break the thickened liquid. It is theorized that the breakers oxidize the alcohol instead of reacting with the thickening agent.

The present invention concerns the discovery of an aqueous-alcohol thickened mixture which can be employed as a fracturing liquid which reverses to a readily flowable liquid after a period of time.

SUMMARY OF THE INVENTION

It has been discovered that the inclusion of an effective amount of a periodic acid and/or water soluble salt thereof in an aqueous-alcohol mixture which has been thickened with a cellulose derivative will reverse the thickened mixture to a relatively flowable fluid after a period of time. The invention also concerns a method of treating a formation adjacent to a well which comprises injecting said thickened liquid composition into the well with sufficient pressure to fracture the formation.

Fracturing equipment and techniques are well known to those skilled in the art and need not be expanded on in any depth herein. Reference may be made to such publications as U.S. Pat. No. 3,393,741 and Craft, Holden and Graves, "Well Design—Drilling and Production," pp. 483–535 (1962), and the publications cited therein for teachings relating to the art of hydraulic fracturing.

BRIEF DESCRIPTION OF THE DRAWING

The drawing illustrates certain data generated in the tests described in detail in the example presented hereinafter. The lines connecting the data points are not intended to illustrate viscosity data actually obtained at each point thereon but are merely employed to better illustrate the relationship which exists between the actual data generated in the example.

PREFERRED EMBODIMENTS OF THE INVENTION

Generally, the aqueous-alcohol mixture contains a volume ratio of an aqueous solution to an alcohol ranging from about 95 to 5 down to about 70 to 30. However, the exact ratio of the alcohol to water is not considered critical to the practice of the present invention.

The aqueous-alcohol mixture is thickened with an effective amount of a cellulose derivative to provide a thickened mass which can be readily pumped with ordinary pressures employed to fracture formations. The exact amount of thickener which is employed depends on many circumstances, including composition of the cellulose derivative employed, the alcohol-water ratio, the desired viscosity for a fracturing job to be performed and the like. Generally, however, about 0.1 percent by weight of the aqueous-alcohol mixture and no more than about 2 percent is suitable.

The liquid composition also contains an effective amount of at least one of a periodic acid and/or a water soluble salt thereof to reverse the thickening action of the cellulose after a certain period of time. Generally, from about 0.5 to 25 percent by weight of the periodate, based on the weight of the cellulose derivative present in the liquid mixture, is employed. Preferably, at least about 5 percent and generally no more than about 15 percent is required. Specific periodates, or mixtures thereof, which can be employed include $HIO_4$, $$HIO_4 \cdot 2H_2O$$

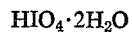

and potassium, sodium, rubidium or cesium periodate.

Alcohols which may be used include any of those well known in the art for use in such fracturing fluids and include, for example, isopropyl alcohol, methanol, ethanol, n-propanol, t-butanol, and various mixtures thereof.

The resulting fracturing fluid should normally have a viscosity of at least about 10 centipoises at the temperature encountered and about 5000 centipoises as a maximum.

Cellulose is a water-insoluble polymer composed of repeating anhydroglucose units. This polymer is made water-soluble by displacing the active hydrogen atoms located on one or more of the cellulosic hydroxyls.

Cellulose derivatives which may be employed as the thickening agent are well known in the art. Included by way of example are various grades of the following derivatives of cellulose: cellulose ether; ethyl hydroxyethylcellulose; ethyl methylcellulose; hydroxyethyl cellulose; hydroxyethyl methylcellulose; hydroxypropyl methyl cellulose; methylcellulose; sodium carboxymethylcellulose; sodium carboxymethyl hydroxyethylcellulose; and sodium cellulose sulfate or various combinations thereof. These cellulose derivatives can be manufactured to have specific physical and chemical characteristics, i.e. viscosity of various solutions can be controlled by providing certain molecular chain lengths. Likewise solubility in organic and aqueous solutions can be controlled by controlling the degree of substitution (DS) and other like modifications.

In the present invention those derivatives which are soluble in aqueous solutions and/or aqueous alcohol solutions are employed. Generally, cellulose derivatives which are soluble in aqueous or aqueous-alcohol mixtures and which provide a viscous system having a minimum viscosity of about 10 centipoises when 0.25 percent by weight of said cellulose is dissolved in an aqueous or aqueous-alcohol mixture at a temperature of 80° F. are suitable for use in the present invention.

Detailed descriptions of various methods for preparing cellulose derivatives having certain physical characteristics can be found in Davidson and Sittig "Water-Soluble Resins," page 8 and pages 50–108, 2d edition, 1968, and in Smith and Montgomery, "The Chemistry of Plant Gums and Mucilages," Monograph Series No. 141, pages 477–480, 1959.

Other than the characteristics cited above the exact cellulose derivative employed is not critical to the practices of the present invention. The individual cellulose derivative may be selected by one practicing the invention given the characteristics of the formation to be treated such as, for example, the presence of inorganic salts, the temperature of formations to be treated, the type, size and weight of propping agents employed and the like.

Specific cellulose derivatives which are suitable include hydroxyethyl cellulose sold commercially under the trademark Natrosol by Hercules of Wilmington, Del. These cellulose derivatives are available in various viscosities as shown in Table A found in U.S. Pat. No. 3,417,820, column 2, starting at line 51. Other cellulose derivatives which can be employed include hydroxypropyl methylcellulose and methylcellulose sold under the trademark Methocel by The Dow Chemical Company, Midland, Mich. These cellulose derivatives are also available in different viscosities as shown in Table 3.1 found at page 51 of the Davidson-Sittig reference. Hydroxyethylcellulose is also available under the trademark Cellosize sold by Union Carbide Corporation. The viscosities of various grades of these latter polymers are shown in Table 4.1 found at page 66 of the Davidson-Sittig reference.

Example

In the present example two different liquids were employed as the base liquid. The first comprised an aqueous solution containing approximately 80 percent by volume of water and 20 percent isopropyl alcohol. The second consisted essentially of tap water. Various samples were prepared by thickening those base liquids with one of the following thickening agents: (A) a partially hydrolyzed polyacrylamide having an average molecular weight of from about 2 to 3 million, sold under the trademark Separan by The Dow Chemical Company; (B) a carboxymethyl hydroxyethylcellulose thickening agent; and (C) hydroxyethylcellulose purchased under the trademark Natrosol.

The tap water was thickened by mixing an equivalent of about 30 pounds of the thickening agent per about 1,000 gallons. The system was agitated with a stirrer until the thickening agent was fully hydrated. Various compounds were then added until they were completely dissolved or dispersed to test their effectiveness to reverse the thickening action of the thickener. The viscosity of the hydrated solution was measured prior to adding the breaker compound and periodically thereafter.

The aqueous-alcohol solution was thickened by mixing an equivalent of about 30 pounds of a thickener per 1,000 gallons of the total aqueous-alcohol mixture. First, the thickener was added to just the water and agitated with a stirrer until completely hydrated. Isopropyl alcohol was then added and the system was stirred until a homogenous system was obtained. A compound to be tested as a breaker was then added and the mixture agitated until the breaker was completely dissolved or dispersed. Again the viscosity was measured prior to adding the breaker and periodically thereafter. The results of these tests, the individual breakers employed, and concentration of the breakers are shown in the following Table:

TABLE I

| Test No. | Thickener | Breaker [1] | Conc., breaker, lbs. | Fluid | Viscosity (cps.) Fann 100 r.p.m.[2] | | | | | | | | | |
|---|---|---|---|---|---|---|---|---|---|---|---|---|---|---|
| | | | | | Start | 1 hr. | 2 hrs. | 2.5 hrs. | 3 hrs. | 4 hrs. | 18 hrs. | 24 hrs. | 48 hrs. | 72 hrs. |
| 1 | A | HAHC | 5 | H₂O | 49.0 | 42 | — | 40.8 | — | — | — | 40.2 | — | 39.0 |
| 2 | A | HAHC | 5 | H₂O/Alc | 66.6 | 55.2 | — | — | — | 55.8 | — | — | 35.4 | — |
| 3 | A | KI | 5 | H₂O | 49.0 | 49.0 | — | 45.0 | — | — | — | 4.2 | — | — |
| 4 | A | KI | 1 | H₂O | 52.2 | — | — | — | — | 46.5 | — | 6.6 | 3.6 | — |
| 5 | A | KI | 0.5 | H₂O | 49.0 | 48.0 | — | — | — | 34.2 | — | 4.6 | — | — |
| 6 | A | KI | 5.0 | H₂O/Alc | 66.6 | 66.9 | — | — | — | 65.5 | — | — | 65.0 | — |
| 7 | A | HS | 5 | H₂O | 49.0 | 39.0 | — | 29.0 | — | — | — | 9.6 | — | 3.0 |
| 8 | A | HS | 1 | H₂O | 52.2 | — | — | — | — | 48.0 | — | 31.5 | 20.0 | — |
| 9 | A | HS | 5 | H₂O/Alc | 66.6 | 55.8 | — | — | — | 56.4 | — | 53.4 | 53.4 | — |
| 10 | A | PH | 4.5 | H₂O | 49.0 | 43.8 | — | 39.0 | — | — | — | 37.2 | — | 30.6 |
| 11 | A | PH | 5 | H₂O/Alc | 66.6 | 64.8 | — | — | — | 63.6 | — | 57.6 | 57.6 | — |
| 12 | A | H | 5 | H₂O | 52.2 | — | — | — | — | 49.5 | — | 39.0 | 31.5 | — |
| 13 | A | H | 3.6 | H₂O | 49.0 | 45.0 | — | 43.8 | — | — | — | 36.6 | — | 15.6 |
| 14 | A | H | 1 | H₂O | 52.2 | — | — | — | — | 51.3 | — | 43.2 | 36.0 | — |
| 15 | A | H | 5 | H₂O/Alc | 66.6 | 66.9 | — | — | — | 66.9 | — | 65.0 | 63.0 | — |
| 16 | A | None | None | H₂O | 49.0 | 49.0 | — | 49.0 | — | — | — | 48.0 | — | 48.4 |
| 17 | A | None | None | H₂O/Alc | 66.6 | 66.3 | — | — | — | 66.6 | — | 65.0 | 63.0 | — |
| 18 | B | None | | H₂O | 22.2 | 22.2 | — | 22.2 | — | — | 21.0 | — | 20.8 | — |
| 19 | B | None | | H₂O/Alc | 31.8 | 30.0 | — | — | — | 33.0 | — | 31.2 | 33.0 | — |
| 20 | B | KI | 5 | H₂O/Alc | 31.8 | 31.2 | — | — | — | 31.8 | — | 17.1 | 7.8 | — |
| 21 | B | KI | 1 | H₂O/Alc | 31.8 | 30.3 | — | — | — | 32.7 | — | 28.5 | 27.0 | — |
| 22 | B | KI | 5 | H₂O | 22.2 | 18.0 | — | 12.0 | — | — | 3.6 | — | 2.0 | — |
| 23 | B | KI | 1 | H₂O | 21.3 | — | — | — | — | 14.1 | — | 6.6 | 6.3 | — |
| 24 | C | None | | H₂O | 40.8 | 40.8 | — | — | — | — | 40.4 | — | 39.0 | — |
| 25 | C | None | | H₂O/Alc | 48.0 | 47.4 | 48.6 | — | — | 49.2 | — | — | 52.8 | — |
| 26 | C | PH | 3 | H₂O | 40.8 | 16.0 | — | — | — | — | 6.0 | — | — | — |
| 27 | C | PH | 1 | H₂O | 39.0 | — | — | — | — | 3.6 | — | — | — | — |
| 28 | C | PH | 5 | H₂O/Alc | 48.0 | 45.0 | 42.0 | — | — | 46.8 | — | — | 27.0 | — |
| 29 | C | HS | 5 | H₂O | 40.8 | — | 39.0 | — | — | — | 25.8 | — | 16.8 | — |
| 30 | C | HS | 1 | H₂O | 39.0 | — | — | — | — | 32.2 | — | 18.3 | 11.1 | — |
| 31 | C | HS | 5 | H₂O/Alc | 48.0 | 49.2 | 49.8 | — | — | 51.0 | — | — | 55.8 | — |

See footnotes at end of table.

TABLE I—Continued

| Test No. | Thickener | Breaker [1] | Conc., breaker, lbs. | Fluid | Viscosity (cps.) Fann 100 r.p.m.[2] | | | | | | | | | |
|---|---|---|---|---|---|---|---|---|---|---|---|---|---|---|
| | | | | | Start | 1 hr. | 2 hrs. | 2.5 hrs. | 3 hrs. | 4 hrs. | 18 hrs. | 24 hrs. | 48 hrs. | 72 hrs. |
| 32 | C | HAHC | 5 | $H_2O$ | 40.8 | 40.8 | 38.4 | — | — | — | 22.2 | — | 13.2 | — |
| 33 | C | HAHC | 2 | $H_2O$ | 41.1 | — | — | — | — | 39.6 | — | 36.3 | 23.9 | — |
| 34 | C | HAHC | 1 | $H_2O$ | 39.0 | — | — | — | — | 33.6 | — | 24.9 | 21.3 | — |
| 35 | C | HAHC | 5 | $H_2O$/Alc | 48.0 | 50.4 | 51.0 | — | — | 52.2 | — | — | 54.6 | — |
| 36 | C | AP | 5 | $H_2O$ | 40.8 | — | 27.6 | — | — | — | 5.2 | — | — | — |
| 37 | C | AP | 1 | $H_2O$ | 39.0 | — | — | — | — | 16.5 | — | 3.6 | — | — |
| 38 | C | AP | 0.5 | $H_2O$ | 41.1 | — | — | — | — | 33.3 | — | 10.2 | 5.7 | — |
| 39 | C | AP | 5 | $H_2O$/Alc | 48.0 | 50.4 | 49.2 | — | — | 46.8 | — | — | 39 | — |
| 40 | C | KP | 5 | $H_2O$ | 40.8 | 15.0 | 9.0 | — | — | — | 2.4 | — | — | — |
| 41 | C | KP | 1 | $H_2O$ | 39.0 | — | — | — | — | 14.7 | — | 4.8 | — | — |
| 42 | C | KP | 0.5 | $H_2O$ | 41.1 | — | — | — | — | 39.3 | — | 37.2 | 35.7 | — |
| 43 | C | KP | 5 | $H_2O$/Alc | 48.0 | 42.0 | 34.2 | — | — | 30.0 | — | — | 24.0 | — |
| 44 | C | KI | 5 | $H_2O$ | 40.8 | 22.0 | — | — | — | 5.0 | 2.0 | — | — | — |
| 45 | C | KI | 1 | $H_2O$ | 39.0 | — | — | — | — | 5.7 | — | 2.4 | — | — |
| 46 | C | KI | 0.5 | $H_2O$ | 41.1 | — | — | — | — | 40.8 | — | 38.1 | 36.9 | — |
| 47 | C | KI | 5 | $H_2O$/Alc | 48.0 | 48.6 | 40.8 | — | — | 21.8 | — | — | 3.0 | — |
| 48 | C | KI | 1 | $H_2O$/Alc | 48.0 | 48.0 | 46.0 | — | — | 30.0 | — | — | 20.0 | — |

[1] The symbols shown mean the follwing: HAHC=hydroxylamine hydrochloride; KI=potassium periodate; HS=hydrazine sulfate; PH=phenylhydrazine; H=hydrazine; AP=ammonium persulfate; KP=potassium permanganate.
[2] A dash indicates that no viscosity value was obtained at that time interval.

The viscosity data obtained in Tests Nos. 40–48 are graphically illustrated in the figure. There it is shown that potassium permanganate and potassium periodate are approximately equally effective in reversing the thickened hydroxyethylcellulose aqueous solution. However in the aqueous-alcohol solution the periodate breaker broke the thickened solution to about the same value as the 100 percent water solution whereas the permanganate mixture still had a viscosity about 8 times that of the periodate system after 48 hours.

The uniqueness of the present composition containing both a cellulose derivative and the periodate breaker is further evidenced by the data obtained when employing the acrylamide polymer (A) wherein, although potassium iodate functioned as a suitable breaker in a 100 percent aqueous solution it failed to break the acrylamide thickened aqueous-alcohol mixture.

In the same manner as described directly hereinbefore sodium periodate, rubidium periodate, cesium periodate, $HIO_4$ or $HIO_4 \cdot 2H_2O$ is added to a thickened aqueous-alcohol mixture in an amount of about 10 percent by weight of a thickener of hydroxypropyl methyl cellulose, methyl cellulose, hydroxyethyl methylcellulose, sodium carboxymethylcellulose and the thickened solution reverts to a flowable system within 48 hours.

What is claimed is:

1. A composition which consists essentially of a thickened intimate mixture of:
   (a) an aqueous-alcohol mixture comprising a volume ratio of an aqueous solution to alcohol ranging from about 95 to 5 down to about 70 to 30, wherein said alcohol is a $C_1$–$C_4$ alkanol,
   (b) an effective amount of a water soluble cellulose derivative thickener selected from the group consisting of cellulose ethers and sodium cellulose sulfate, to increase the viscosity of said aqueous-alcohol mixture at the temperature of use to at least about 10 centipoises said derivative characterized as providing a viscosity in said aqueous-alcohol mixture of at least about 10 centipoises when 0.25 percent by weight of said derivative is dissolved in said aqueous-alcohol mixture at a temperature of 80° F., and
   (c) from about 0.5 to about 25 percent by weight based on the weight of said cellulose derivative of at least one of periodic acid, potassium periodate, sodium periodate, rubidium periodate or cesium periodate to reverse said thickened aqueous-alcohol mixture to form a readily flowable liquid after a period of time.

2. The composition as defined in claim 1 wherein said cellulose derivative is employed in an amount ranging from about 0.1 to 2 percent by weight of said aqueous-alcohol mixture.

3. The composition as defined in claim 1 which includes in addition a propping agent.

4. In a method of fracturing a subterranean formation wherein a fluid is injected into a wellbore which penetrates said formation and a pressure sufficient to fracture said formation is applied to said fluid, the improvement which comprises employing as the fluid a thickened intimate mixture which consists essentially of:
   (a) an aqueous-alcohol mixture comprising a volume ratio of an aqueous solution to alcohol ranging from about 95 to 5 down to about 70 to 30, wherein said alcohol is a $C_1$–$C_4$ alkanol,
   (b) an effective amount of a water soluble cellulose derivative thickener selected from the group consisting of cellulose ethers and sodium cellulose sulfate, to increase the viscosity of said aqueous-alcohol mixture at the temperature of use to at least about 10 centipoise said derivative characterized as providing a viscosity in said aqueous-alcohol mixture of at least about 10 centipoises when 0.25 percent by weight of said derivative is dissolved in said aqueous-alcohol mixture at a temperature of 80° F., and
   (c) from about 0.5 to about 25 percent by weight based on the weight of said cellulose derivative of at least one of periodic acid, potassium periodate, sodium periodate, rubidium periodate or cesium periodate to reverse said thickened aqueous-alcohol mixture to form a readily flowable liquid after a period of time.

5. The improved method as defined in claim 4 wherein at least about 0.5 percent by weight based on the weight of the cellulose derivative of said periodic acid or periodate salt is intimately provided in said thickened aqueous-alcohol mixture.

6. The improved method as defined in claim 4 wherein potassium periodate is provided in an amount ranging from about 0.5 to 25 percent by weight of said cellulose derivative present in said thickened aqueous-alcohol mixture.

7. The improved method as defined in claim 4 wherein said thickened aqueous-alcohol mixture includes in addition a propping agent.

References Cited
UNITED STATES PATENTS

| 3,024,191 | 3/1962 | Jones | 252—8.55 |
| 3,167,510 | 1/1965 | Alter | 252—8.55 |
| 3,442,803 | 5/1969 | Hoover et al. | 252—8.55 |

HERBERT B. GUYNN, Primary Examiner

U.S. Cl. X.R.

166—308